April 21, 1953

L. W. BOOTHBY ET AL 2,636,085

FREQUENCY DETERMINING DEVICE

Filed Sept. 5, 1945

2 SHEETS—SHEET 1

Inventors
LAWRENCE W. BOOTHBY
FRANK C. ISELY

By M. C. Hayes

ATTORNEY

Inventors
LAWRENCE W. BOOTHBY
FRANK C. ISELY
By Ralph L. Chappell
Attorney

Patented Apr. 21, 1953

2,636,085

UNITED STATES PATENT OFFICE 2,636,085

FREQUENCY DETERMINING DEVICE

Lawrence W. Boothby, Alexandria, Va., and
Frank C. Isely, Washington, D. C.

Application September 5, 1945, Serial No. 614,583

7 Claims. (Cl. 178—44)

(Granted under Title 35, U. S. Code (1952), sec. 266)

This invention relates to frequency determining apparatus adapted to distinguish between a plurality of signal responses, only one of which corresponds to the actual carrier frequency being received, and more particularly, to a frequency determining device suitable for operation in the range of approximately 80 to 320 megacycles.

In the operation of certain ultra-high frequency superheterodyne receivers ambiguous frequency readings often occur because of the presence of spurious responses. Spurious responses are produced by non-linearity in the mixer when harmonics of the fundamental frequency of the local oscillator combine in the mixer, predominantly with the fundamental of the incoming signal; and to a lesser extent with the higher harmonics of the signal, which are usually of negligible amplitude. Under these circumstances, it is often difficult, if not impossible, to determine the true carrier frequency being received.

In the prior art, attempts have been made to use one or more stages of preselection in order to minimize trouble from spurious responses produced in superheterodyne receivers. However, preselection for ultra-high frequency superheterodyne receivers has not proven feasible at the present time.

Accordingly, it is an object of the present invention to provide simple positive means for distinguishing between a plurality of signal responses and to thereby enable the selection of a correct frequency reading corresponding to the fundamental of the carrier frequency actually being received by the radio receiver.

Another object of this invention is to provide means for quickly identifying and determining that frequency corresponding to the fundamental input signal frequency which is included in a group of spurious intermediate-frequency responses.

Another object of this invention is to provide a compact frequency determining device capable of being tuned over a wide frequency range.

Still another object of the present invention is to provide a novel resonant transmission line circuit having variable lumped circuit inductance and capacitance suitable for operation in the ultra-high frequency range.

Other objects and features of the present invention will appear more fully hereinafter from the following detailed description considered in connection with the accompanying drawings which disclose one embodiment of the invention. It is expressly understood however that the drawings are designed for purposes of illustration only and not as a definition of the limits of the invention, reference for the latter purpose being had to the appended claims.

In the drawings, wherein similar reference characters denote similar elements throughout the several views.

Figure 1:
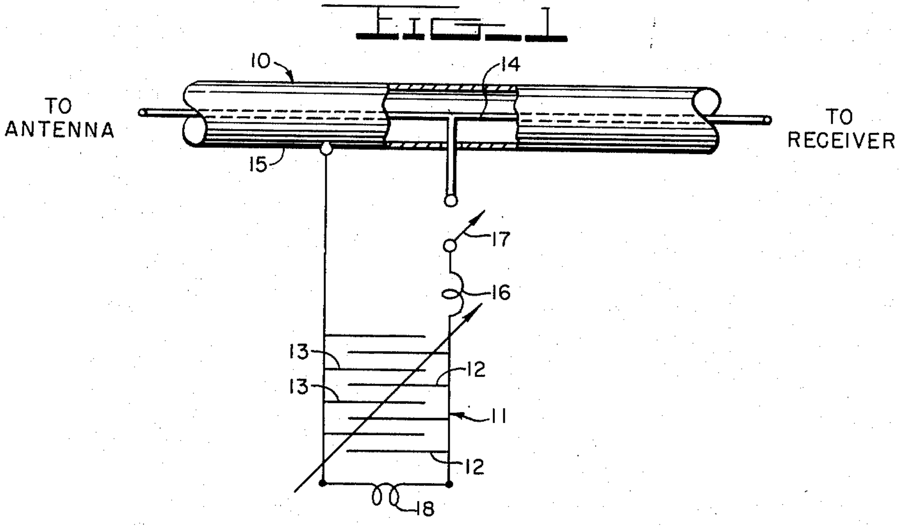
Fig. 1 is a circuit diagram of a frequency determining device embodying the principles of the present invention.

With reference more particularly to Fig. 1 of the drawings a circuit diagram of a frequency determining device embodying the principles of the present invention is disclosed therein coupled to a coaxial transmission line 10 which comprises the input line from an antenna to an ultra-high frequency superheterodyne radio receiver. The frequency determining device includes a variable capacitor 11 of conventional construction including a plurality of stator plates 12 and rotor plates 13. The stator and rotor plates at the upper end of the capacitor, as viewed in the drawing, are respectively connected to the inner conductor 14 and the outer conductor 15 of the transmission line 10, with the connection between the stator plate and the inner conductor including series inductance 16 and switch 17. For a purpose that will appear more fully hereinafter, an inductance 18 is connected across the stator and rotor plates at the other end of the variable capacitor 11.

Figure 2:
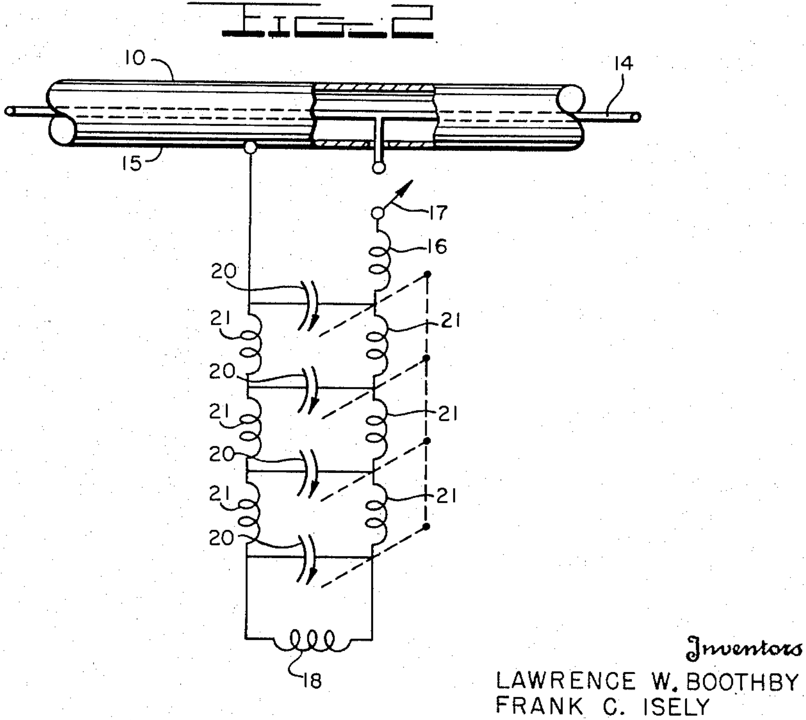
Fig. 2 is an equivalent circuit diagram illustrating operation of the Fig. 1 device in the high frequency range.

Operation of the Fig. 1 circuit arrangement is more readily understood with reference to Fig. 2 which illustrates its equivalent circuit when operating in the ultra-high frequency range. As shown, the variable capacitor 11 functions as though it composed a transmission line with lumped variable circuit elements including a plurality of ganged variable capacitors 20 connected in parallel by inductances 21. One end of this lumped transmission line is connected to the line 10, and the other end thereof is shunted by the inductance 18.

With this novel interpretation, in the ultra-high frequency range, of the behavior of a variable capacitor as an equivalent transmission line with lumped variable circuit elements, it follows from the theory of transmission lines that the shorting of the inductor across the end plates of the aforesaid capacitor unit results in an effective reduction in the length of the transmission line; that is, a transmission line is produced which will be resonant at a higher frequency. In this manner an ultra-high frequency series-resonant circuit may be provided utilizing a comparatively large size variable capacitor therefor.

For example, it was found that the tuning range of the series-resonant circuit comprising an inductor and a capacitor, without the second shorting conductor across the capacitor was from 40 to 180 megacycles. However, after adding the shorting inductor 18, it was found that a higher frequency range, that is, from 80 to 320 megacycles, was obtainable.

In the lower frequency ranges investigated in the prior art, the placing of a one or two turn inductor across the end plate of a multiplate capacitor results in the effective shorting thereof, which renders the device inoperative. However, in an ultra-high frequency range, a device according to Fig. 1 functions in a novel and unexpected, but in an entirely satisfactory and desirable manner, thereby becoming utilizable as a wave trap in the ultra-high frequency range.

Figure 4:
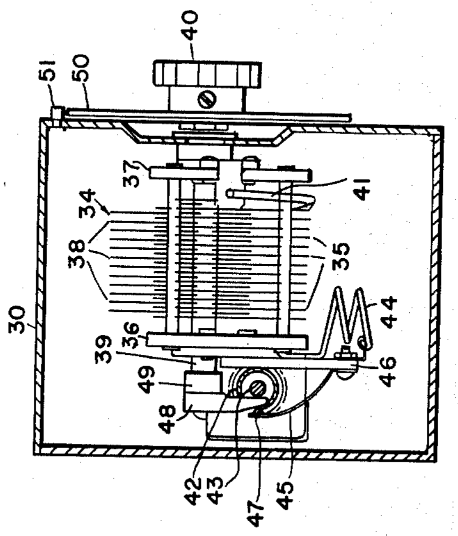
Fig. 4 is a sectional illustration through the line 4—4 of Fig. 3.
Figure 3:
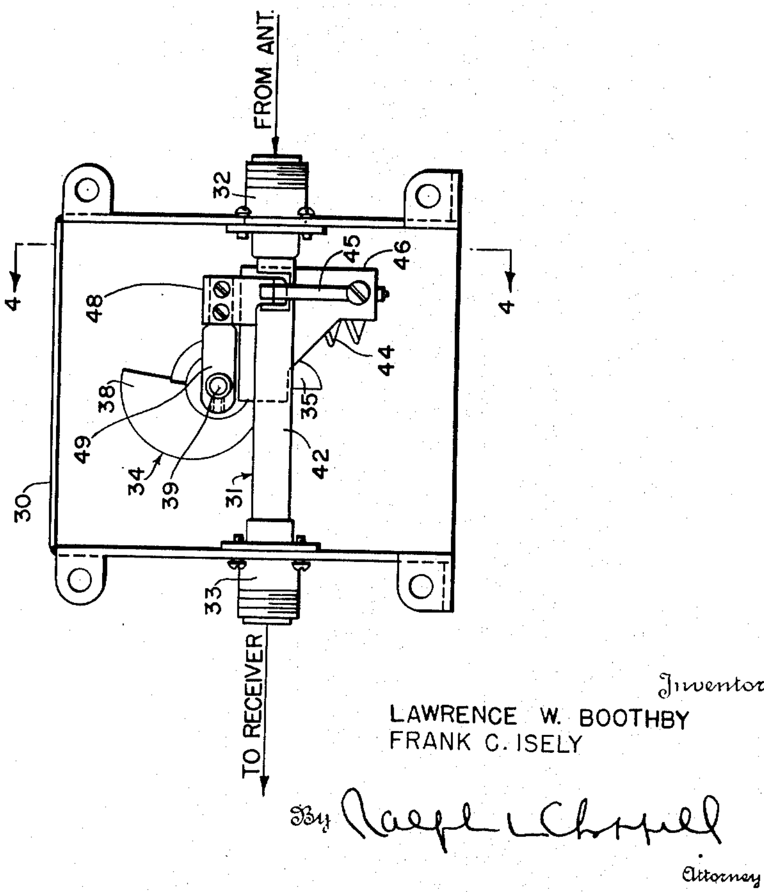
Fig. 3 is a diagrammatic illustration of a frequency determining device constructed in accordance with the principles of the present invention.

A frequency determining device constructed in accordance with the principles of the present invention is shown in Figs. 3 and 4 including a rectangular metallic casing 30 for housing and electrically shielding the components thereof. A concentric transmission line 31 is positioned transversely of the container 30 having antenna output connector 32 and receiver output connector 33 coupled to the opposite ends thereof externally of the casing 30. The variable capacitor 34 of the device includes a plurality of stator plates 35 supported by structure including end plates 36 and 37, and a plurality of rotor plates 38, which may be shaped for straight line frequency calibration, mounted on a shaft 39 journaled in the end plates and rotated by knob 40 secured to one end thereof outside the casing 30. The capacitor 34 is mounted on one of the casing walls with the longitudinal axis of the shaft 39 perpendicular to the transmission line 31. An inductor 41, which may comprise a coil having fractional or plural turns, is connected between the stator and rotor plates at the end of the capacitor further removed from the transmission line 31. The inductor 41 corresponds to the inductance 18 of Figs. 1 and 2.

The outer conductor 42 and the inner conductor 43 of the transmission line 31 are respectively connected to the rotor and stator plates at the end of the capacitor nearest thereto. The connection to the rotor plates is not shown in the drawing and may be formed by any suitable means, while the connection to the stator plates includes a switching device, operable upon rotation of the knob 40, and a series inductor 44 corresponding to the inductance 16 of Figs. 1 and 2. The switching device comprises a spring member 45 having one end thereof secured to a stationary insulating support 46 and electrically connected to one end of the inductor 44. A contact terminal 47 is provided on the free end of the spring member 45 which is normally urged, through a slotted portion of the outer conductor 42, into contact with the inner conductor 43. A cooperating dimple, not shown, may be provided in the inner conductor for establishing a good electrical contact. Actuating means for the switching device includes a wedged shaped member 48, constructed of insulating material, secured to the free end of an arm 49 positioned on the end of the shaft 39 adjacent the transmission line 30 for rotation therewith. With the foregoing arrangement, when the capacitor 34 is adjusted for minimum capacitance, the wedged shaped member 48 is interposed between the contact terminal 47 and the inner conductor 43, and when the knob 40 is rotated slightly the member 48 moves away from the path of movement of the spring member 45 and electrical contact is established between the terminal 47 and the inner conductor 43.

The device is provided with indicating means comprising a frequency calibrated dial 50 mounted on the shaft 39, and a stationary indicia 51 associated therewith. When the capacitor is tuned to minimum capacitance the dial 50 and indicia 51 indicate the lowest frequency of the device.

When the frequency determining device of the present invention is employed to determine the fundamental carrier frequency from a group of spurious frequency responses, the knob 40 is rotated to the position of minimum capacitance, in which case the device is disconnected from the receiver and offers substantially no attenuation. Then the receiver is tuned to locate a signal. To determine if this signal is the fundamental carrier frequency or a spurious frequency the knob 40 is rotated to increase the frequency of the device until maximum attenuation of the received signal is noted. Since, as described heretofore, the capacitor 34 functions as a transmission line, the length of which varies with capacitance tuning, maximum attenuation of the received signal occurs when the effective length of the transmission line is equal to one half wavelength of the received signal frequency, in which case a low impedance is established across the transmission line 31.

If the frequency indicated by the receiver dial does not correspond to the frequency value on the dial 50 adjacent the indicia 51, the receiver is tuned to spurious frequency. The receiver is then tuned to the frequency indicated by the dial 50, with the device disconnected from the transmission line 31. This tuning of the receiver may be checked by operating the frequency determining device in the foregoing manner.

As stated heretofore, the inductor 41 short-circuiting the stator and rotor plates at one end of the capacitor allows use of a comparatively large size capacitor in a frequency determining device operable in the ultra-high frequency range.

Although only one embodiment of the present invention has been disclosed and described herein it is expressly understood that various changes and substitutions may be made therein without departing from the spirit of the invention as well understood by those skilled in the art. Reference therefore will be had to the appended claims for a definition of the limits of the invention.

The invention described herein may be manufactured and used by or for the Government of the United States of America for governmental purposes without the payment of any royalties thereon or therefor.

What is claimed is:

1. In combination with a high frequency radio receiver, a system for distinguishing a carrier frequency from a plurality of spurious frequency responses, said system including a frequency determining device comprising a variable capacitor having a plurality of parallel stator and rotor plates connected to respectively form the two conductors of a resonant two conductor transmission line section, a first inductor, means coupling the receiver input signals to said capacitor comprising a connection between said first inductor and the first plate at one end of said capacitor, and a second inductor connected across the last plates of said capacitor located at the other end of said capacitor.

2. A frequency determining device comprising a coaxial line having input and output connectors, a variable capacitor having a plurality of parallel stator and rotor plates connected to respectively form the two conductors of a resonant two conductor transmission line section, means connecting the first stator and rotor plates at one end of said capacitor across said line, a first inductor included in the foregoing connection, and a second inductor shunted across the last stator and rotor plates at the other end of said capacitor so that a series-resonance circuit is provided across said coaxial line operable in the ultra-high frequency range.

3. A frequency determining device comprising a coaxial line having input and output connectors, a variable capacitor having a plurality of parallel stator and rotor plates connected to form the two conductors of a resonant two conductor transmission line section, means including a switch connecting the first stator and rotor plates at one end of said capacitor across said line, a first inductor included in the foregoing connection, a second inductor shunted across the last stator and rotor plates at the other end of said capacitor, and means for controlling said switch in response to rotation of said rotor plates.

4. In combination with an antenna coupled to an ultra-high frequency radio receiver through a transmission line, a frequency determining device coupled to said line, said device comprising a variable capacitor having a plurality of parallel stator and rotor plates connected to form the two conductors of a resonant two conductor transmission line section, means including a series inductor connecting the first stator and rotor plates at one end of said capacitor across said line, and a second inductor shunting the last stator and rotor plates at the other end of said capacitor.

5. In combination with an antenna coupled to an ultra-high frequency radio receiver through a transmission line, a frequency determining device coupled to said line, said device comprising a variable capacitor having a plurality of parallel stator and rotor plates connected to respectively form the two conductors of a resonant two conductor transmission line section, means including inductance means connecting the first stator and rotor plates at one end of said capacitor across said line, second inductance means connected across the last rotor and stator plates at the other end of said capacitor, and switch means for controlling the connection between said capacitor and said line in accordance with rotation of said rotor plates.

6. A lumped circuit transmission line having a variable series-resonance frequency in the ultra-high frequency range comprising a capacitor having a plurality of parallel rotor and stator plates connected to respectively form the two conductors of a resonant two conductor transmission line section, a first impedance shunted across the last rotor and stator plates at one end of said capacitor, feed lines connected to the rotor and stator plates at the other end of said capacitor, and an impedance serially connected in one of said feed lines.

7. A lumped circuit transmission line having a variable-series resonance frequency in the ultra-high frequency range comprising a variable capacitor having a plurality of parallel rotor and stator plates connected to respectively form the two conductors of a resonant two conductor transmission line section, a first inductor shunted across the last rotor and stator plates at one end of said capacitor, and circuit means connected to the rotor and stator plates at the other end of said capacitor, said circuit means including a second inductor series connected to a plate at the other end of said capacitor.

LAWRENCE W. BOOTHBY.
FRANK C. ISELY.

References Cited in the file of this patent

UNITED STATES PATENTS

| Number | Name | Date |
|---|---|---|
| 1,694,895 | Taylor et al. | Dec. 11, 1928 |
| 1,761,211 | Jones et al. | June 3, 1930 |
| 2,024,234 | Kunze | Dec. 17, 1935 |
| 2,258,974 | Dagnall | Oct. 14, 1941 |
| 2,370,758 | Thompson | Mar. 6, 1945 |
| 2,384,504 | Thias | Sept. 11, 1945 |

OTHER REFERENCES

Radio Amateur's Handbook of 1940, published by the American Radio Relay League, page 4 in the catalogue section.

"Radio News" for March 1927, pages 1126, 1127. Title, "The construction and theory of wave-traps," by James Wood, Jr.